United States Patent [19]

Takabayashi

[11] 4,210,929
[45] Jul. 1, 1980

[54] VIDEO PROJECTING APPARATUS WITH RASTER DISTORTION CORRECTION

[75] Inventor: Kazuhiko Takabayashi, Tokyo, Japan

[73] Assignee: Sony Corporation, Tokyo, Japan

[21] Appl. No.: 936,731

[22] Filed: Aug. 25, 1978

[30] Foreign Application Priority Data

Aug. 30, 1977 [JP] Japan .................................. 52-103998

[51] Int. Cl.² ............................................... H04N 9/16
[52] U.S. Cl. ..................................... 358/64; 315/370; 315/371
[58] Field of Search ..................... 358/60, 64; 315/320, 315/321

[56] References Cited

U.S. PATENT DOCUMENTS

| | | | |
|---|---|---|---|
| 2,989,584 | 6/1961 | Mengle | 358/60 |
| 3,015,691 | 1/1962 | Poorter | 358/60 X |

*Primary Examiner*—Robert L. Richardson

*Attorney, Agent, or Firm*—Lewis H. Eslinger; Alvin Sinderbrand

[57] ABSTRACT

A video projecting apparatus for projecting a compound color image on a projection screen including a plurality of color cathode ray tubes, each of the cathode ray tubes having a phosphor screen for producing a color image, each of the color images being of a different color, a plurality of projecting lenses for projecting the color images on the projection screen with predetermined elevation and horizontal deflection angles, and a pre-distorting device for distorting a raster shape of each of the color images on the respective phosphor screen to compensate for distortion of the projected color image, in which the center of the longest horizontal scanning line of each of the color images coincides with the center of a respective horizontal line of the respective one of the phosphor screens of the color cathode ray tubes.

4 Claims, 9 Drawing Figures

VIDEO PROJECTING APPARATUS WITH RASTER DISTORTION CORRECTION

BACKGROUND OF THE INVENTION

1. Field of the Invention

The present invention relates generally to a color video projecting apparatus. More particularly, the present invention relates to a color video projecting apparatus for projecting a color image on a projection screen in which monochrome images of different colors are produced on a plurality of cathode ray tubes and projected and composed as a color image on the projection screen through optical systems such as projecting lenses with minimum misalignment.

2. Description of the Prior Art

It is well known in the art to utilize color video projecting apparatus as shown in FIGS. 1 to 3 in which the present invention can be utilized. In this apparatus, a red color cathode ray tube 1R and a green color cathode ray tube 1G are located in opposing relation to a projection screen 2, and a blue color cathode ray tube 1B, facing up, is located under the cathode ray tubes 1R and 1G, respectively, as shown in FIGS. 2 and 3. The light from an image on the red color cathode ray tube 1R passes through a half mirror 3, and then through a lens 4R by which it is projected on the projection screen 2. The light from an image on the green color cathode ray tube 1G passes through a lens 4G and is then projected on the screen 2. The light from an image on the blue color cathode ray tube 1B is reflected on the half mirror 3, passes through the lens 4R, and is then projected on the screen 2.

In this apparatus, optical or light axes 5R and 5G of the lenses 4R and 4G are directed to a center $O_s$ of the projection screen 2. Cathode ray tubes 1R, 1G and 1B are arranged so that the angles between a normal 6 to the screen 2 and the light axes 5R and 5G in the horizontal direction are both equal to $\omega$, i.e., the light axes 5R and 5G are symmetric with respect to the normal 6, as shown in FIG. 1. In addition, the angle between the normal 6 and the light axes 5R and 5G in the vertical direction is selected as $\alpha$. Thus, in utilizing the prior art apparatus, the red and blue color video image lights are composed by the half mirror 3, this compounded light being composed with the green color video image light on the screen 2 to form a color image.

In the above prior art apparatus, the light axis 5R of the lens 4R and the light axis 5G of the lens 4G are inclined at the angle $\omega$ in the horizontal direction and the angle $\alpha$ in the vertical direction with respect to the normal 6 of the projection screen 2, as described above. In this manner, the light axes 5R and 5G are not perpendicular to the screen 2, and the resulting image composed on the screen 2 is distorted in a keystone configuration which is asymmetric with respect to the horizontal center line appearing in the image on the screen 2.

To avoid this distortion, the prior art devices pre-distort the rasters on the cathode ray tubes 1R, 1G and 1B in the reverse direction to the key stone configuration, as shown in FIGS. 4A and 4B, to compensate for the key stone distortion on the screen 2. FIGS. 4A and 4B show a schematic representation of the superposition of the raster on the cathode ray tubes 1G and 1R such that a vertical line 10 of the raster intersects a center 0 of the phosphor plate of each of the cathode ray tubes, and the images on the respective cathode ray tubes 1G and 1R are symmetric with respect to an imaginary vertical center line 11 on each of the cathode ray tubes. The image on the cathode ray tube 1B is the same as the image on the cathode ray tube 1R. In this manner, the cathode ray tubes 1R, 1G and 1B are arranged so that the images on the cathode ray tubes 1R, 1G and 1B are projected on the screen 2 with the center 0 of each of the cathode ray tubes being projected on the center $O_s$ of the screen 2.

Each of the cathode ray tubes 1R, 1G and 1B, in the prior art apparatus, has a flat front panel or phosphor screen, as shown in FIG. 5. In this manner, even if the deflection angles $\theta_1$ and $\theta_2$ of the cathode ray tubes are equal at the center and edge portions of the front panel or phosphor screen, the respective lengths $L_1$ and $L_2$ of the scanning lines on the phosphor screen are not equal. This difference in the lengths of the scanning lines becomes large at the near edge of the phosphor screen, as shown in the graph of FIG. 6.

In the instance where the images are pre-distorted, as shown in FIGS. 4A and 4B, left and right lengths $a_1$ and $a_2$ of the scanning line, which are measured from the vertical line 10 in the original image, are equal at their upper edges. In addition, left and right lengths $b_1$ and $b_2$ of the scanning line, which are measured from the center line 11, are not equal at their upper edges. As a result, the image on the cathode ray tube 1G is enlarged at its right upper end, while the image on the cathode ray tube 1R is enlarged at its left upper end. Therefore, when these images are composed on the screen, they are not coincident with each other at the upper left and right corners with the result that misalignment occurs and a color picture of high quality can not be obtained.

OBJECTS AND SUMMARY OF THE INVENTION

Accordingly, it is an object of the present invention to provide a novel video projecting apparatus free from the above mentioned drawbacks inherent in the prior art.

It is another object of the present invention to provide a color video projecting apparatus for projecting a color image on a projection screen without any misalignment.

According to an aspect of the present invention, there is provided a video projecting apparatus for projecting a compound color image on a projection screen, comprising a plurality of color cathode ray tubes, each of the cathode ray tubes having a phosphor screen for producing a color image, each of the color images being of a different color, a plurality of projecting means for projecting the color images on the projection screen with predetermined elevation and horizontal deflection angles, and a pre-distorting means for distorting each raster shape of the color images on the phosphor screens to compensate for distortion of the projected color image, in which the center of the longest horizontal scanning line of each of the color images coincides with the center of a respective horizontal line of the respective one of the phosphor screens of the color cathode ray tube.

The above, and other objects, features and advantages of the present invention, will become apparent from the following description taken in conjunction with the accompanying drawings in which like numerals represent like parts.

DESCRIPTION OF THE PREFERRED EMBODIMENT

One embodiment of the video projecting apparatus for projecting a color image on a projection screen according to the present invention is described below with respect to FIGS. 7A and 7B.

Figure 1:
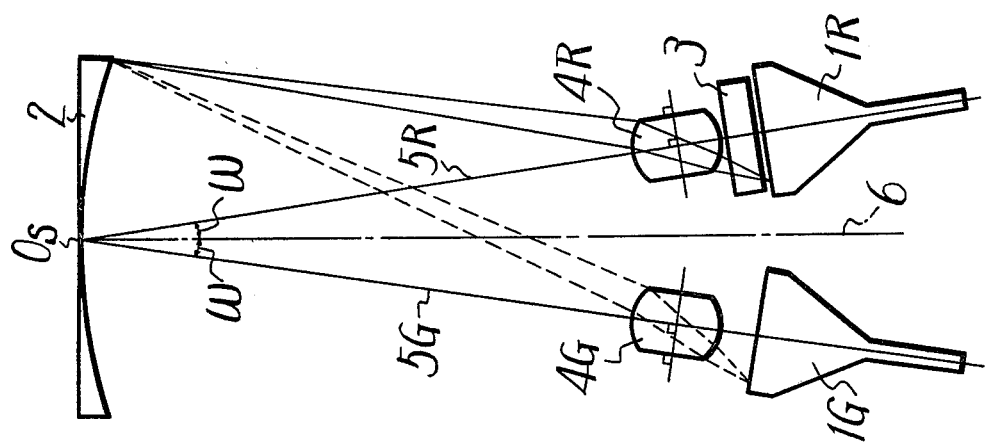
FIG. 1 is a schematic top plan view of a prior art video projection apparatus in which the present invention can be utilized.
Figure 2:
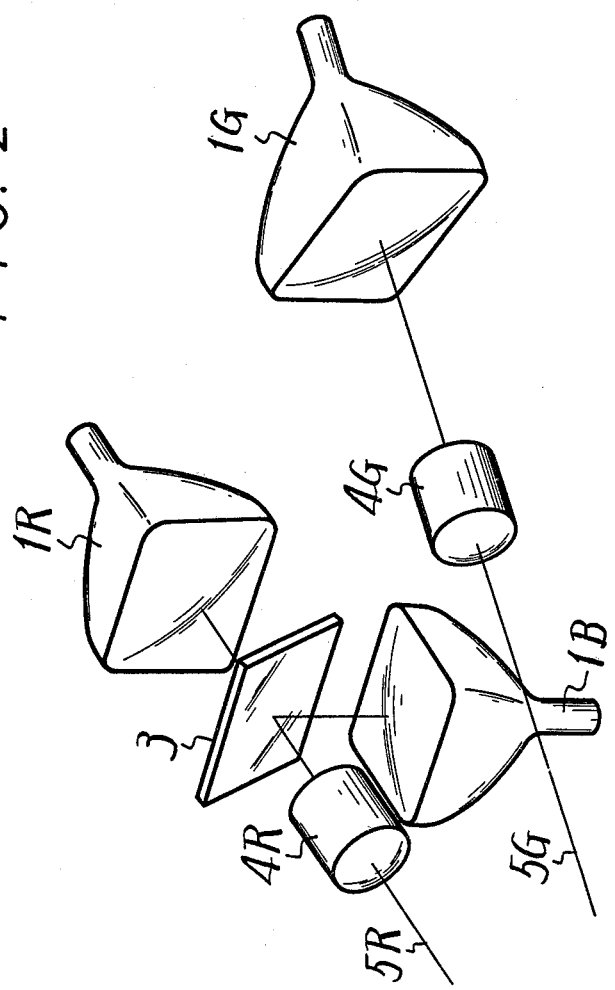
FIG. 2 is a perspective schematic view of the apparatus of FIG. 1.
Figure 3:
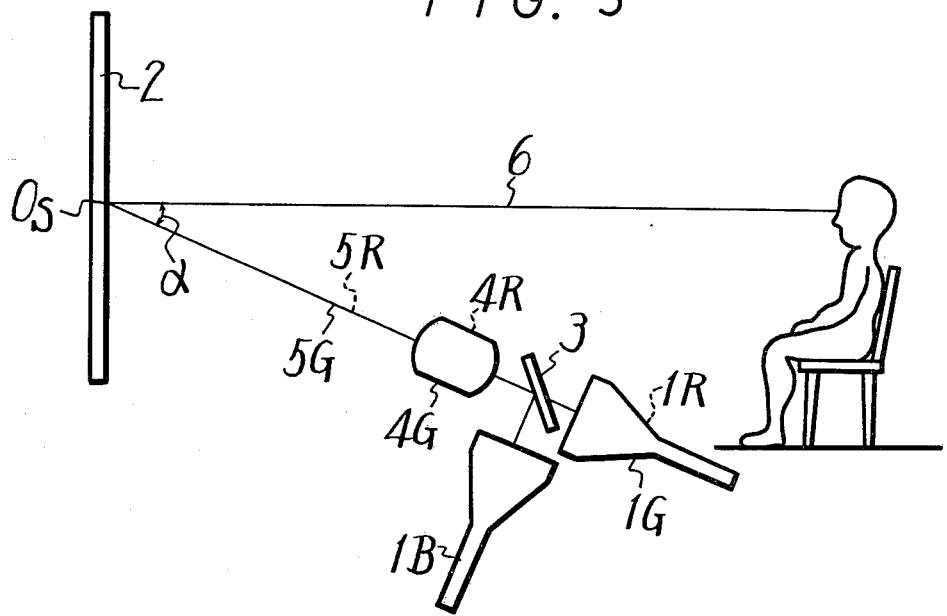
FIG. 3 is a schematic side elevational view of the apparatus of FIG. 1.
Figure 4A:
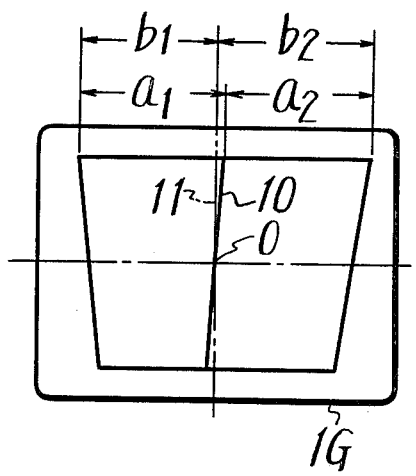
FIG. 4A is a schematic representation of a raster superimposed upon the phosphor screen of one of the cathode ray tubes in FIGS. 1–3.
Figure 4B:
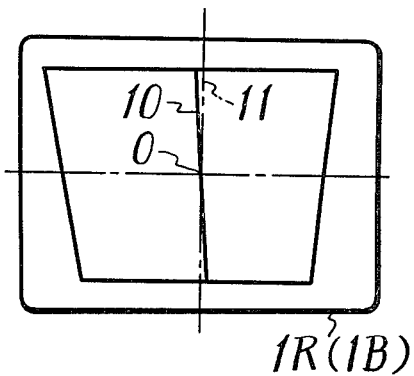
FIG. 4B is a schematic representation of a raster superimposed on the phosphor screen of another of the cathode ray tubes in FIGS. 1–3.
Figure 5:
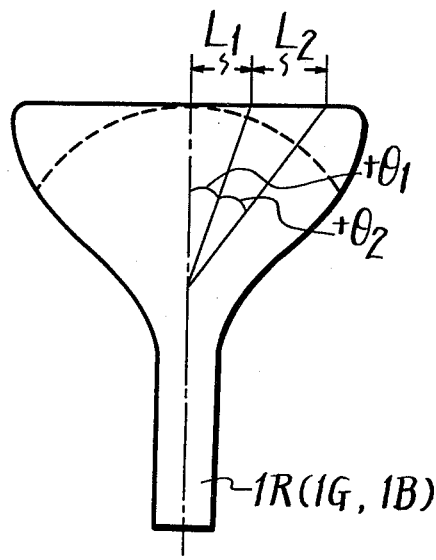
FIG. 5 is a schematic plan view of a cathode ray tube to which reference is made in explaining a problem inherent in the prior art.
Figure 6:
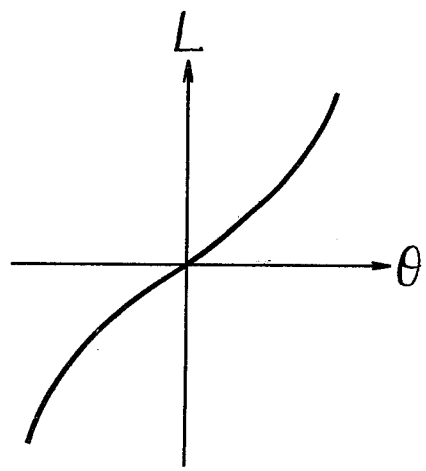
FIG. 6 is a graphical plot of cathode ray deflection angles verses the length of the scanning lines on the phosphor screen of the cathode ray tube of FIG. 5.
Figure 7A:
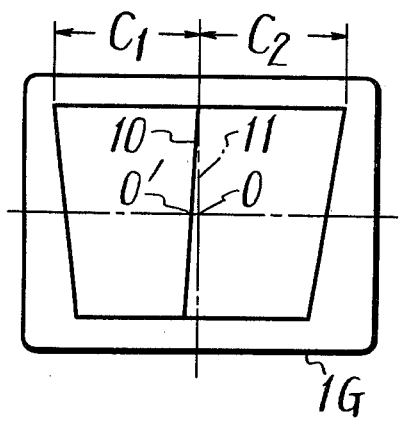
FIGS. 7A and 7B are schematic diagrams of rasters according to the present invention shown superimposed on the respective cathode ray tube screens.
Figure 7B:
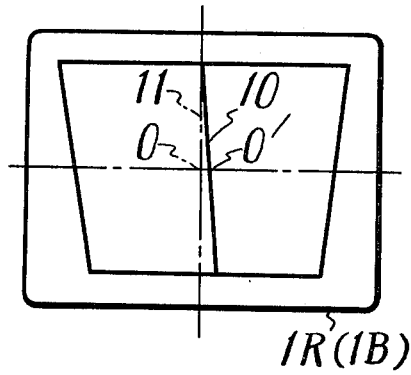

In the embodiment of the invention shown in FIGS. 7A and 7B, the horizontal deflection positions of the cathode ray tubes 1R, 1G and 1B are adjusted or compensated for by any suitable means such as conventional, deflecting devices such that the upper end of the vertical line 10 of the raster produced on each of the cathode ray tubes 1R, 1G and 1B coincides with the upper end of the center line 11 of each of the cathode ray tubes. In this manner, the cathode ray tubes 1R, 1G and 1B and lenses 4R and 4G, shown in FIGS. 1 to 3, are located such that a center O', along center line 10, of each of the images on the cathode ray tubes, is projected on the center $O_s$ of the projection screen 2, shown in FIG. 1. As a result, left and right lengths $C_1$ and $C_2$ of the scanning line, which are measured from the center line 11 of each of the cathode ray tubes on the upper edge of the raster, are equal, resulting in the elimination of any color misalignment on the upper edge of the raster. However, the left and right lengths of the scanning line, measured from the center line 11 of the cathode ray tube at the lower edge of the raster, are not equal. However, since the total length of the scanning line at the lower edge of the raster is rather short, even if both the lengths of the left and right scanning lines are not equal, there is not much enlargement of the left or right scanning lines and any misalignment that occurs is negligible.

As described above, according to the present invention, at the upper edge of the raster, where the scanning line is longest, the center of the image is made coincident in the horizontal direction with the center of the cathode ray tube. In this manner, there is negligible enlargement of any one part of the image and a color image of good quality can be produced on the screen by composing the different color images.

It will be apparent that many modifications and variations can be effected by one skilled in the art without departing from the spirit or scope of the novel concepts of the present invention which is intended to be defined by the appended claims.

I claim as my invention:

1. A video projecting apparatus for projecting a compound color image onto a projection screen comprising:
   a plurality of color cathode ray tubes, each of said cathode ray tubes having a phosphor screen for producing a color image, each of said color images being of a different color;
   a plurality of projecting means for projecting said color images on said projection screen with predetermined elevation and horizontal deflection angles; and
   a pre-distorting means for distorting raster shapes of said color images on said respective phosphor screens to compensate for distortion of said projected color images, wherein the center of the longest horizontal scanning line of each of said color images coincides with the center of a respective horizontal line of the respective one of said phosphor screens of said color cathode ray tubes.

2. A video projecting apparatus according to claim 1; in which said longest horizontal scanning line is located at the upper edge of said color image.

3. A video projecting apparatus according to claim 1; in which each said cathode ray tube has an optical axis which intersects said projection screen at the center thereof and which is inclined at an angle to a normal to said screen at the center thereof.

4. A video projecting apparatus according to claim 1; in which each said projecting means includes a lens for focusing the respective color image on said projection screen.

* * * * *